US012030304B2

(12) United States Patent
Yoshimura et al.

(10) Patent No.: US 12,030,304 B2
(45) Date of Patent: Jul. 9, 2024

(54) CONVEYANCE DEVICE, IMAGE FORMATION APPARATUS, AND IMAGE FORMATION SYSTEM

(71) Applicant: Konica Minolta, Inc., Tokyo (JP)

(72) Inventors: Kazutoshi Yoshimura, Hino (JP); Satoshi Ogata, Hachioji (JP); Masayuki Watanabe, Fuchu (JP); Hidenori Mine, Tachikawa (JP)

(73) Assignee: Konica Minolta, Inc., Tokyo (JP)

( * ) Notice: Subject to any disclaimer, the term of this patent is extended or adjusted under 35 U.S.C. 154(b) by 272 days.

(21) Appl. No.: 17/531,312

(22) Filed: Nov. 19, 2021

(65) Prior Publication Data

US 2022/0176715 A1 Jun. 9, 2022

(30) Foreign Application Priority Data

Dec. 8, 2020 (JP) ................................ 2020-203422

(51) Int. Cl.

| | |
|---|---|
| ***B41J 11/00*** | (2006.01) |
| ***B41J 11/42*** | (2006.01) |
| ***B41J 15/04*** | (2006.01) |
| ***G03G 15/00*** | (2006.01) |

(52) U.S. Cl.

CPC ............ *B41J 11/007* (2013.01); *B41J 11/009* (2013.01); *B41J 11/42* (2013.01); *B41J 15/048* (2013.01); *G03G 15/5029* (2013.01); *B41J 11/0095* (2013.01); *G03G 15/6529* (2013.01)

(58) Field of Classification Search

CPC ......... B41J 11/007; B41J 11/009; B41J 11/42; B41J 15/048; B41J 11/0095; G03G 15/6529; G03G 15/5029

See application file for complete search history.

(56) References Cited

U.S. PATENT DOCUMENTS

2009/0085275 A1* 4/2009 Suzuki ............... G03G 15/6567 271/4.02
2015/0062582 A1* 3/2015 Adachi .................. G01B 11/06 399/45

FOREIGN PATENT DOCUMENTS

| | | |
|---|---|---|
| JP | 2009-29622 A | 2/2009 |
| JP | 2015-108611 A | 6/2015 |
| JP | 2018-87878 A | 6/2018 |

OTHER PUBLICATIONS

Japanese Office Action (JPOA) mailed Apr. 23, 2024 and issued in Japanese patent application No. 2020-203422 and its English machine translation.

* cited by examiner

*Primary Examiner* — Henok D Legesse
(74) *Attorney, Agent, or Firm* — RANKIN, HILL & CLARK LLP

(57) ABSTRACT

A conveyance device includes a conveyance path on which a medium is carried; a first detector that detects the medium on the conveyance path and generates first property data; and a hardware processor that acquires the first property data and second property data generated by detecting the medium disposed at a position away from the conveyance path.

16 Claims, 9 Drawing Sheets

CONVEYANCE DEVICE, IMAGE FORMATION APPARATUS, AND IMAGE FORMATION SYSTEM

The entire disclosure of Japanese patent Application No. 2020-203422, filed on Dec. 8, 2020, is incorporated herein by reference in its entirety.

BACKGROUND

Technological Field

The present invention relates to a conveyance device, an image formation apparatus, and an image formation system.

Description of the Related Art

In recent years, electrophotographic image formation apparatuses have been widely used in many fields. For example, in the field of production printing (PP) and the like, an image formation apparatus adaptive to more various media (for example, a recording medium such as a sheet) is required. In order to perform high-quality image formation on these various media, a method of setting the type of media accommodated in a sheet feed tray and performing image formation under conditions according to the setting is used. For example, JP 2009-29622 A proposes a method in which a sensor for detecting properties of a medium is disposed in an image formation apparatus to perform medium detection. Various conditions for image formation are set on the basis of a result of the medium detection.

In such an image formation apparatus, it is desirable to increase efficiency of medium detection. Thus, various condition settings and image formation based on a result of the medium detection can be efficiently advanced.

SUMMARY

The present invention has been made in view of the above circumstances, and an object thereof is to provide a conveyance device, an image formation apparatus, and an image formation system capable of improving efficiency of medium detection.

To achieve the abovementioned object, according to an aspect of the present invention, a conveyance device reflecting one aspect of the present invention comprises: a conveyance path on which a medium is carried; a first detector that detects the medium on the conveyance path and generates first property data; and a hardware processor that acquires the first property data and second property data generated by detecting the medium disposed at a position away from the conveyance path.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
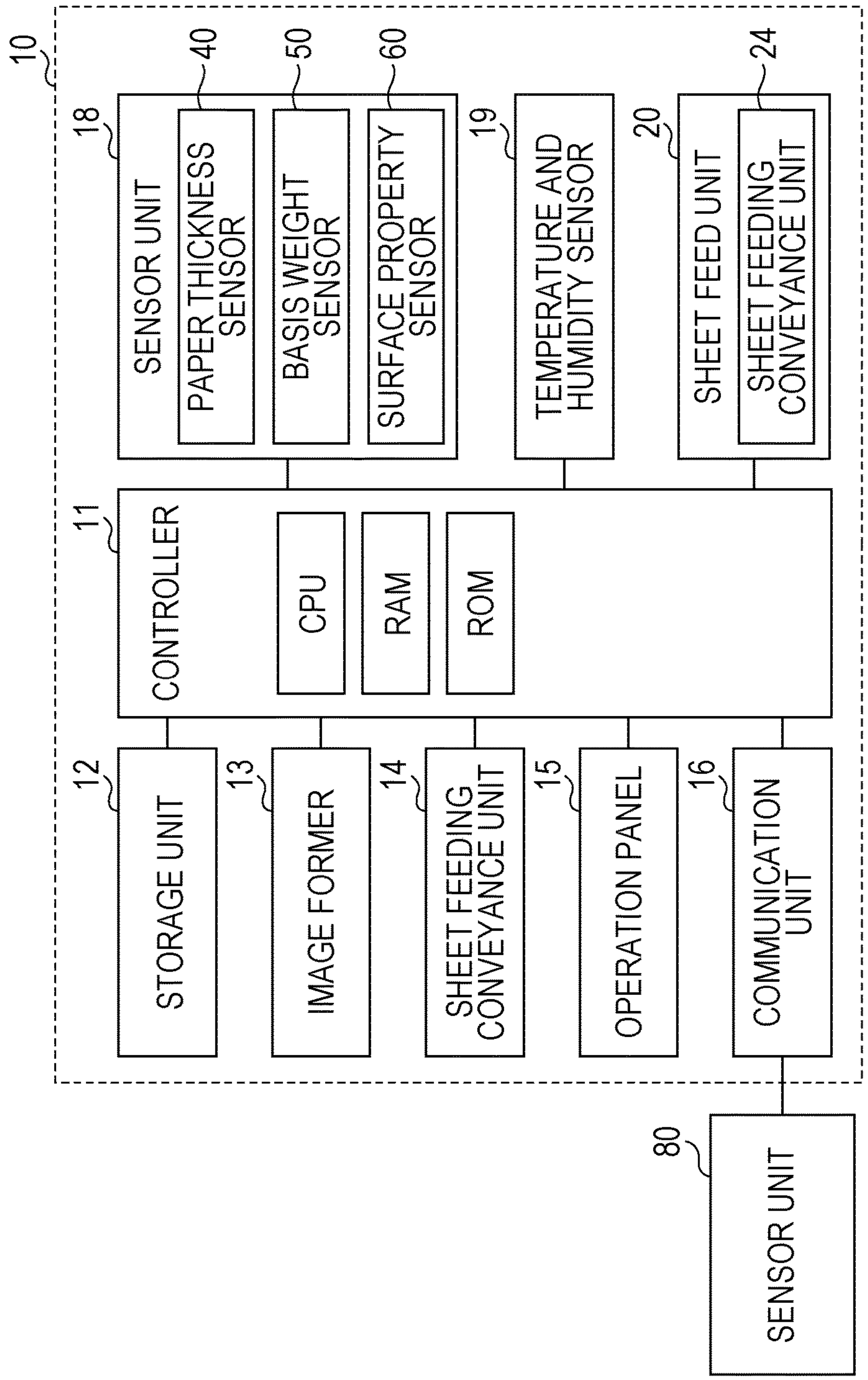
FIG. 1 is a block diagram illustrating a configuration of an image formation system according to an embodiment.

Hereinafter, one or more embodiments of the present invention will be described with reference to the drawings. However, the scope of the invention is not limited to the disclosed embodiments. Note that in the description of the drawings, the same elements are denoted by the same reference numerals, and redundant description will be omitted. Further, dimensional ratios in the drawings are exaggerated for convenience of description, and may be different from actual ratios. In the drawings, a vertical direction is a Z direction, a front surface and back surface direction of an image formation apparatus is an X direction, and a direction orthogonal to the X and Z directions is a Y direction. The X direction is also referred to as a width direction. In the present embodiment, media (recording media) include printing sheets and various films. In particular, the printing sheets include ones produced by using plant-derived mechanical pulp and/or ones produced using chemical pulp. Further, types of the recording media include glossy paper, matte paper, plain paper, high-gloss paper, and the like. Hereinafter, the media are also simply referred to as sheets.

Embodiment

Figure 2:
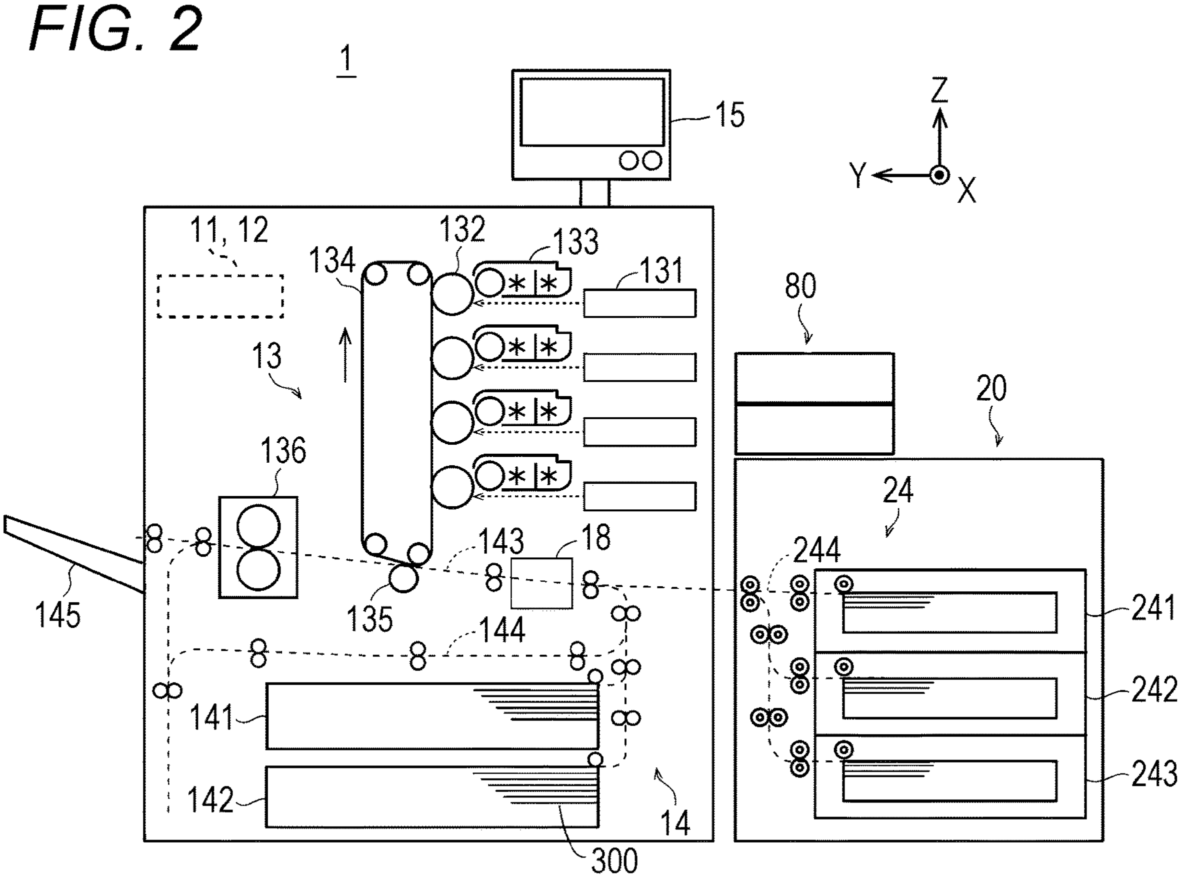
FIG. 2 is a view illustrating a schematic configuration of the image formation system illustrated in FIG. 1.

FIG. 1 is a block diagram illustrating a configuration of an image formation system 1 according to an embodiment of the present invention, and FIG. 2 is a cross-sectional view schematically illustrating a configuration of the image formation system 1. The image formation system 1 includes an image formation apparatus 10 and a sensor unit 80 communicably connected to the image formation apparatus 10 (FIG. 1). The image formation apparatus 10 includes a controller 11, a storage unit 12, an image former 13, a sheet feeding conveyance unit 14, an operation panel 15, a communication unit 16, a sensor unit 18, a temperature and humidity sensor 19, and a sheet feed unit 20. These are connected to each other via a signal line such as a bus for exchanging signals. In the image formation system 1, for example, an image is formed on a sheet 300 conveyed from the sheet feeding conveyance unit 14 or the sheet feed unit 20. Here, the image formation apparatus 10 corresponds to a specific example of the conveyance device and the image formation apparatus of the present invention.

(Controller 11)

The controller 11 includes a central processing unit (CPU), a read only memory (ROM), a random access memory (RAM), and the like. The controller 11 executes various types of processing by executing a program stored in the ROM or the storage unit 12, and performs control of the image formation system 1 and various types of arithmetic processing according to the program.

(Storage Unit 12)

Figure 12:
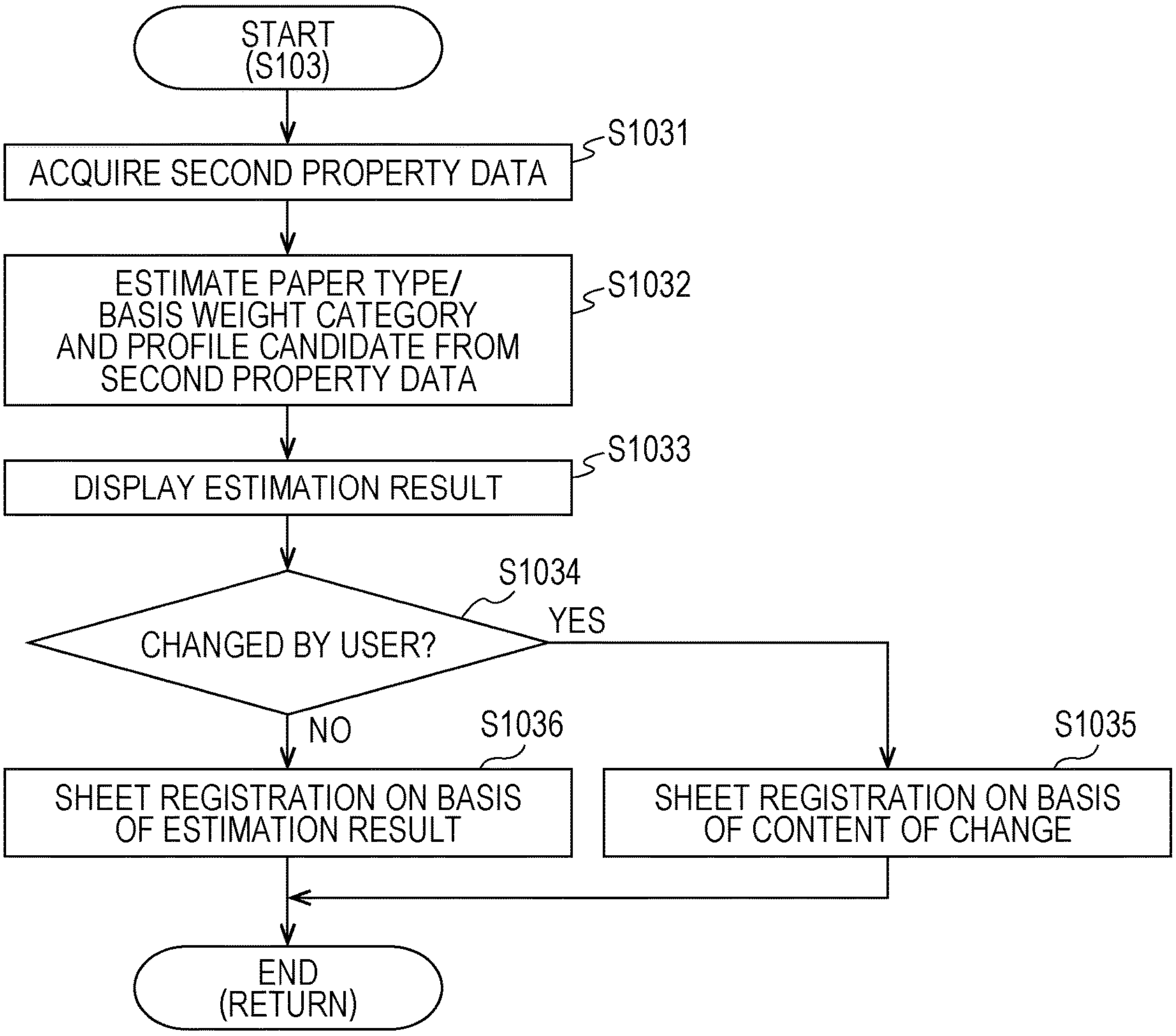
FIG. 12 is a flowchart illustrating a subroutine of step S103 illustrated in FIG. 8.

The storage unit 12 includes an auxiliary storage unit such as a hard disk that stores various programs and various data in advance. Further, the storage unit 12 stores sheet information stored in each sheet feed tray. The sheet information includes information of a brand, a size (sheet width and sheet length), a basis weight (weight), and a sheet type (coated paper, plain paper, high-quality paper, rough paper, or the like) of the sheet, and is set by sheet registration processing (FIG. 12 and the like described later). Furthermore, the storage unit 12 may store a learned model and a paper profile (both will be described later) used for determination of a sheet brand or a paper type.

(Image Former 13)

The image former 13 forms an image by, for example, an electrophotographic method. The image former 13 includes writing units 131, photosensitive drums 132, development devices 133 that store two-component developers including toners and carriers of respective colors (FIG. 2), which correspond to respective basic colors of yellow (Y), magenta (M), cyan (C), and black (K), and the like. Also, the image former 13 further includes an intermediate transfer belt 134, a secondary transfer unit 135, and a fixing unit 136. Toner images formed on the photosensitive drums 132 by the development devices 133 of the respective colors are superimposed on each other on the intermediate transfer belt 134 and transferred to the sheet 300 conveyed in the secondary transfer unit 135. The toner images on the sheet 300 are fixed on the sheet 300 by being heated and pressurized by the fixing unit 136 on the downstream side.

(Sheet Feeding Conveyance Unit 14)

The sheet feeding conveyance unit 14 includes a plurality of sheet feed trays 141 and 142, conveyance paths 143 and 144, and a sheet ejection tray 145. For example, a plurality of sheets 300 is stacked on each of the sheet feed trays 141 and 142. The conveyance path 143 is a path for conveying the sheet 300 from each of the sheet feed trays 141 and 142 to the sheet ejection tray 145 via the image former 13, and includes a plurality of conveyance roller pairs and a drive motor (not illustrated) that drives these conveyance roller pairs. The sensor unit 18 is disposed on the conveyance path 143. The conveyance path 143 near the sensor unit 18 is, for example, formed between opposing sheet metals (for example, a lower guide plate 181 and an upper guide plate 182 in FIG. 3 to be described later) or the like. The sheet feeding conveyance unit 14 includes, for example, a sending roller that sends out the uppermost sheet among the plurality of sheets 300 stacked in the sheet feed trays 141 and 142. The sheets 300 in the sheet feed trays 141 and 142 are sent out to the conveyance path 143 one by one by the sending roller, for example. The sheet 300 passes through the conveyance path 143.

The conveyance path 144 is a conveyance path for double-sided image formation, and the sheet 300 on which an image is formed on one side by the image former 13 is conveyed to the conveyance path 144. Like the conveyance path 143, the conveyance path 144 includes a plurality of conveyance roller pairs and a drive motor (not illustrated) that drives these conveyance roller pairs. The sheet 300 conveyed to the conveyance path 144 is reversed on front and back sides in a switchback path, then joins the conveyance path 143, and an image is formed on the other surface of the sheet 300 again by the image former 13. The sheet 300 on which the image is formed is ejected onto the sheet ejection tray 145.

(Operation Panel 15)

The operation panel 15 includes a touch panel, a numeric keypad, a start button, a stop button, and the like, displays the state of the image formation apparatus 10 or the image formation system 1, and is used for setting of the type of sheet placed on the sheet feed tray 141 or the like and inputting an instruction from a user. Here, the operation panel 15 corresponds to a specific example of a display of the present invention.

(Communication Unit 16)

The communication unit 16 communicates with other external devices such as the sensor unit 80 and a PC terminal by a universal serial bus (USB) cable, a wired local area network (LAN), a wireless LAN (for example, a LAN conforming to the IEEE 802.11 standard), or the like.

(Sensor Unit 18)

The sensor unit 18 provided in the conveyance path 143 detects the properties of the sheet 300 on the conveyance path 143. The sensor units 18 and 80 are what are called media sensors, and sheet registration of the sheet 300 and setting of an image forming condition are performed on the basis of the detection result of the sheet 300 by the sensor units 18 and 80. The inside of the image formation apparatus 10, more specifically, the sensor unit 18 provided in the conveyance path 143 is an in-line type medium sensor. Here, the sensor unit 18 corresponds to a specific example of a first detector of the present invention.

The sensor unit 18 detects the sheet 300 set (loaded) in a sheet feed tray (sheet feed trays 141, 142, 241, 242, and 243) used for a print job. That is, since the sheet 300 can be detected in real time, medium detection and image formation can be smoothly performed.

Figure 3:
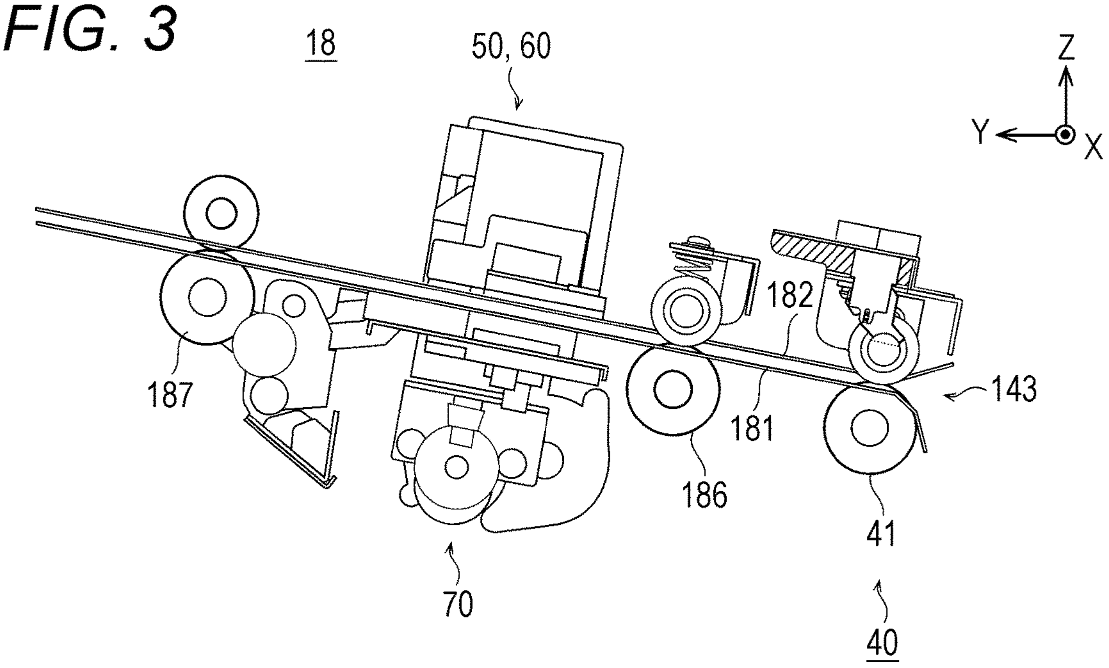
FIG. 3 is a side view of a periphery of a sensor unit inside the image formation apparatus illustrated in FIG. 2.

FIG. 3 is a side view illustrating a configuration of the sensor unit 18. The sensor unit 18 includes, for example, a paper thickness sensor 40, a basis weight sensor 50, a surface property sensor 60, and a sheet pressing mechanism 70. For example, the paper thickness sensor 40 is disposed on the upstream side in the conveyance direction, and the basis weight sensor 50, the surface property sensor 60, and the sheet pressing mechanism 70 are disposed on the downstream side in the conveyance direction with respect to the paper thickness sensor 40. For example, the basis weight sensor 50 and the surface property sensor 60 are disposed side by side in the width direction (X direction) at the same position in the conveyance direction. For example, the basis weight sensor 50 is disposed on the front side, and the surface property sensor 60 is disposed on the back side. The surface property sensor 60 and the sheet pressing mechanism 70 are disposed to face each other in the Z direction, and for example, the surface property sensor 60 is disposed on the upper side of the conveyance path 143, and the sheet pressing mechanism 70 is disposed on the lower side. In the conveyance path 143, conveyance roller pairs 41, 186, and 187 are disposed in order from the upstream side. In the vicinity of the sensor unit 18, the sheet 300 is conveyed through between the lower guide plate 181 and the upper guide plate 182 facing each other in the Z direction.

(Paper Thickness Sensor 40) The paper thickness sensor 40 detects the thickness of the sheet 300. The paper thickness sensor 40 includes, for example, a conveyance roller pair 41 and a displacement sensor. In the paper thickness sensor 40, the sheet 300 is conveyed to a nip of the conveyance roller pair 41, and thereby the axial position of a driven roller (one of the conveyance roller pair 41) displaced according to the thickness of the sheet 300 is measured. The conveyance roller pair 41 is, for example, a driven roller in which a lower roller is a fixed drive roller (with a fixed axial center) and an upper roller is a driven roller biased so as to be separable from the drive roller. The height of the upper roller is detected by the displacement sensor. The displacement sensor includes, for example, an actuator (detection lever) that comes into contact with an upper roller shaft and an encoder that measures a rotation amount of the actuator. From the paper thickness sensor 40, for example, the thickness (microns) of the sheet 300 is output as a measurement result of a sheet property (hereinafter, also referred to as "sheet thickness").

(Basis Weight Sensor 50)

The basis weight sensor 50 is a transmissive optical sensor that detects physical property values corresponding to the basis weight of the sheet 300. The basis weight sensor 50 includes, for example, a light emitter provided below the conveyance path 143 and a light receiver provided thereabove, and measures an attenuation amount (transmittance) of light transmitted through the sheet 300. For example, the transmittance is output from the basis weight sensor 50 as a measurement result of the sheet property (hereinafter, it is also simply referred to as "basis weight").

(Surface Property Sensor 60)

The surface property sensor 60 includes, for example, a casing, a light emitter, a collimating lens, and a plurality of light receivers, and optically detects regular reflection light and diffusion reflection light from a sheet surface as described below. The upper guide plate 182 is provided with an opening (measurement region). This opening is an irradiation area of the light receiver. The sheet 300 conveyed to the opening is temporarily stopped. In this state, the sheet is pressed by the sheet pressing mechanism 70 from the lower side, and the sheet 300 is positioned. A reference surface in the opening is a virtual surface including a lower surface of the upper guide plate 182, and at the time of measurement, the surface of the positioned sheet 300 which is the object to be measured is disposed on the reference surface. Irradiation light made substantially parallel by the collimating lens is emitted from the light emitter at an incident angle of 75° with respect to the reference surface. The wavelength of the irradiation light is, for example, 465 nm. The plurality of light receivers receives the regular reflection light and the diffusion reflection light. The light receivers are disposed, for example, at three locations of reflection angles of 30 degrees (for the diffusion reflection light), 60 degrees (for the diffusion reflection light), and 75 degrees (for the regular reflection light), at two locations of 60 degrees and 75 degrees, or at two locations of 30 degrees and 75 degrees. The signal of the light receiver is output from the surface property sensor 60 as a measurement result of the sheet property (hereinafter, also referred to as "surface property").

(Sheet Pressing Mechanism 70)

The sheet pressing mechanism 70 is disposed below the lower guide plate 181. As described above, the sheet pressing mechanism 70 plays a role of pressing the sheet when the surface property sensor 60 detects the sheet property. The sheet pressing mechanism 70 includes, for example, a pressing part, a drive motor, a cam mechanism, and the like. An upper surface of the pressing part is a flat surface that moves up and down by driving of the drive motor and is parallel to the lower guide plate 181 and is substantially the same surface as the lower guide plate 181 at the time of normal sheet passage, but rises at the time of measurement to press the sheet 300 against the surface property sensor 60 side. In the pressed state, the conveyance of the sheet 300 is stopped.

As described above, the sensor unit 18 conveys the sheet 300 to the conveyance path 143 to generate property data (hereinafter referred to as first property data) of the sheet 300 related to the sheet thickness, basis weight, and surface property. The controller 11 acquires the first property data, and performs sheet registration of the sheet 300 and setting of the image forming condition on the basis of the first property data.

(Temperature and Humidity Sensor 19)

The temperature and humidity sensor 19 includes a temperature sensor and a humidity sensor, and measures temperature and humidity around the image formation apparatus 10.

(Sheet Feed Unit 20)

The sheet feed unit 20 includes a sheet feeding conveyance unit 24 (FIG. 2). Further, in addition to the sheet feeding conveyance unit 24, the sheet feed unit 20 includes a controller, a storage unit, and a communication unit (all not illustrated) that communicates with the image formation apparatus 10, which are connected to each other via a signal line such as a bus for exchanging signals. The sheet feeding conveyance unit 24 includes a plurality of sheet feed trays 241, 242, and 243, and a conveyance path 244. The sheet is conveyed from each of the sheet feed trays 241, 242, and 243 to the sensor unit 18 and the image former 13 via the conveyance path 244 and the conveyance path 143.

(Sensor Unit 80)

The sensor unit 80 is what is called an off-line medium sensor, and is provided at a position away from the conveyance path 143, more specifically, outside the image formation apparatus 10. The sensor unit 80 has a function similar to that of the sensor unit 18, and generates property data (hereinafter referred to as second property data) of the sheet 300. In the off-line type sensor unit 80, since medium detection can be performed without passing through the conveyance path 143, the sheet 300 after the detection can be used for image formation. Here, this sensor unit 80 corresponds to a specific example of a second detector of the present invention.

The second property data generated by the sensor unit 80 preferably includes at least one piece of data related to the same property as the first property data. Thus, as will be described later, it is possible to collate the first property data of the sheet 300 used for a predetermined print job with information regarding sheet setting based on the second property data.

In the present embodiment, this sensor unit 80 is connected to the image formation apparatus 10 via the communication unit 16, and the second property data generated by the sensor unit 80 is automatically acquired by the image formation apparatus 10. Thus, the image formation apparatus 10 can acquire the second property data and perform sheet registration and reservation setting of a print job on the basis of the second property data even in a period in which the sensor unit 80 cannot generate the first property data, which will be described in detail later.

The sensor unit 80 may be connected to the image formation apparatus 10 via a network, or may be connected to the image formation apparatus 10 via wiring such as a cable.

Figure 4A:
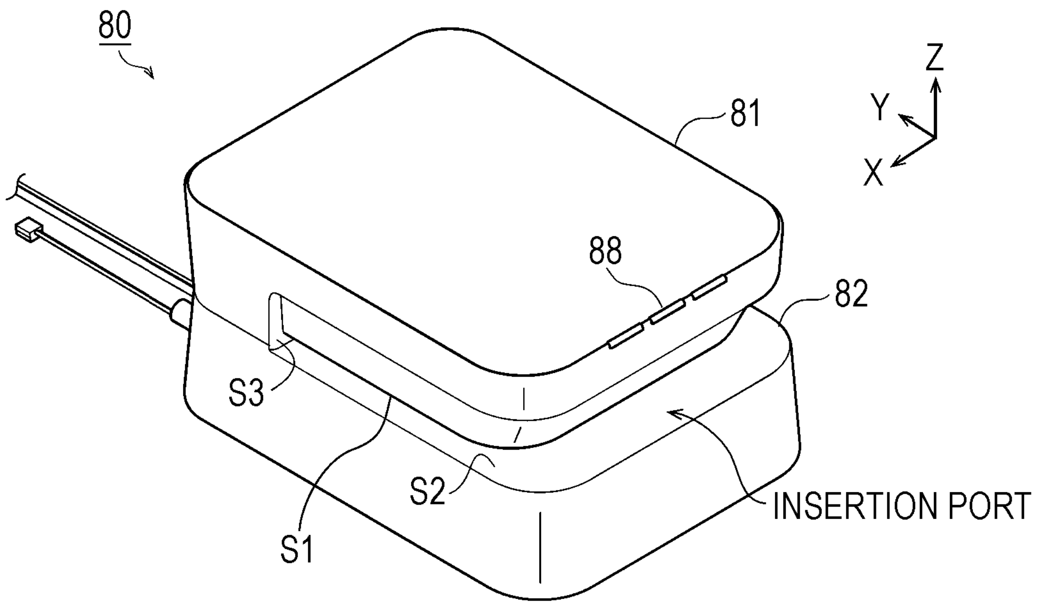
FIGS. 4A and 4B are a perspective view and a side view, respectively, illustrating an external appearance of the sensor unit outside the image formation apparatus illustrated in FIG. 2.
Figure 4B:
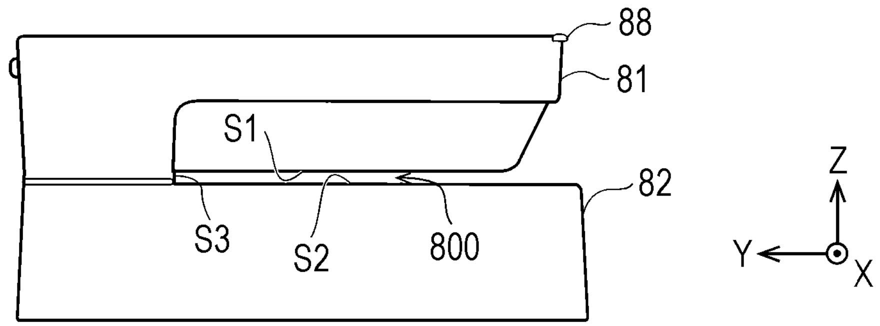
Figure 5A:
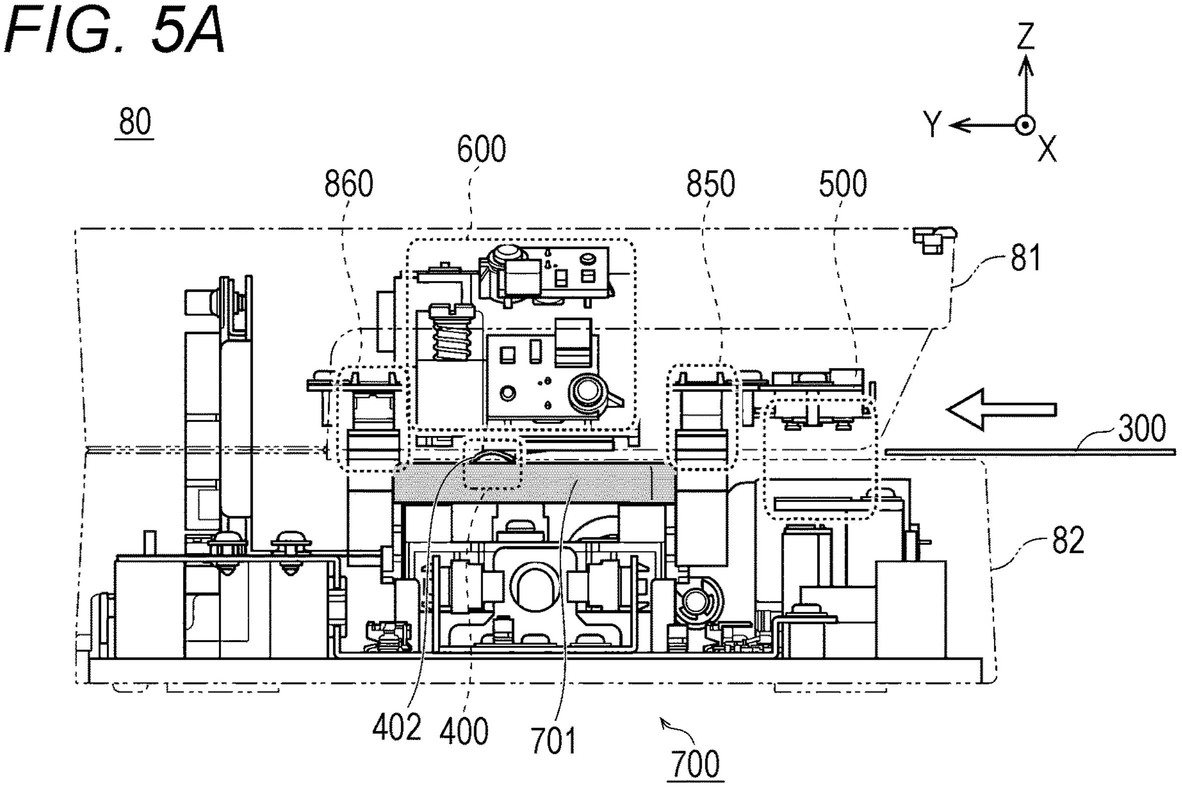
FIGS. 5A and 5B are a cross-sectional view of the sensor unit illustrated in FIGS. 4A and 4B, and a schematic top view illustrating a detection region and the like in a lower casing.
Figure 5B:
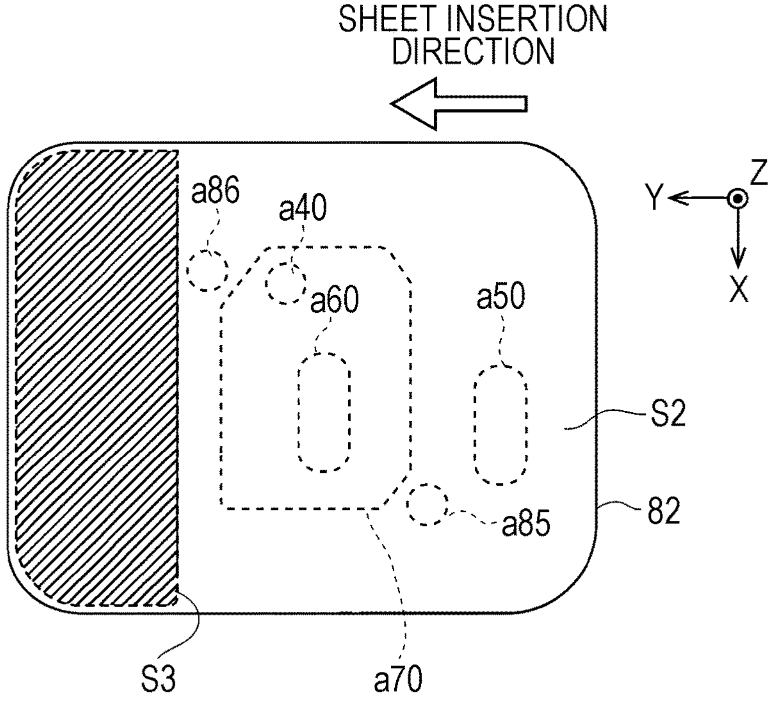

FIGS. 4A and 4B are a perspective view and a side view, respectively, illustrating an external appearance of the sensor unit 80. FIG. 5A is a side view illustrating an internal configuration of the sensor unit 80, and FIG. 5B is a schematic top view illustrating a detection region and the like in a lower casing (a lower casing 82 described later) of the sensor unit 80.

The sensor unit 80 includes an upper casing 81 and a lower casing 82 (FIG. 4A and FIG. 4B). On an upper front surface of the sensor unit 80, an LED display 88 for indicating the state of the device by the presence or absence of lighting is disposed. An upper surface of the lower casing 82 is a mounting surface S2 on which the sheet 300 inserted by the user is placed. At the time of measurement, the user manually inserts the sheet 300 into a sheet passage region 800 from an insertion port. At this time, the sheet 300 moves along an insertion direction (Y direction) while sliding on the mounting surface S2, abuts against a wall s3 on the back side, and stops.

As illustrated in FIG. 5A, in the sensor unit 80, a basis weight sensor 500, a first medium set sensor 850, a surface property sensor 600, a paper thickness sensor 400, and a second medium set sensor 860 are disposed in order from the insertion port toward the back side. Further, the paper thickness sensor 400 is mounted on a pressing plate 701 of a sheet pressing mechanism 700 and moves along with vertical movement of the pressing plate 701.

The pressing plate 701 plays a role of pressing the sheet 300 at the time of measurement. Furthermore, the sensor unit 80 includes a controller and a storage unit (not illustrated), and controls various operations.

The paper thickness sensor 400, the basis weight sensor 500, the surface property sensor 600, and the sheet pressing mechanism 700 have the same functions as the paper thickness sensor 400, the basis weight sensor 500, the surface property sensor 600, and the sheet pressing mechanism 70 of the sensor unit 18, respectively, in the apparatus described above. The first medium set sensor 850 and the second medium set sensor 860 detect the presence or absence of the sheet in the detection region. For example, these sensors are reflective sensors, and include a light emitter that emits light toward a detection region (detection region a30 as described later) and a light receiver that receives reflected light from the sheet 300, which are disposed above the sheet passage region 800 (upper casing 81).

As illustrated in FIG. 5B, in the sensor unit 80, a detection region a50 of the basis weight sensor 500, a detection region a85 of the first medium set sensor 850, a detection region a60 of the surface property sensor 600, a detection region a40 of the paper thickness sensor 400, and a detection region a86 of the second medium set sensor 860 are disposed in order from the insertion port toward the back side.

The basis weight sensor 500 and the surface property sensor 600 are the same as the basis weight sensor 50 and the surface property sensor 60 of the sensor unit 18, respectively, and the description thereof will be omitted. The sheet pressing mechanism 700 and the paper thickness sensor 400 are functionally the same as the sheet pressing mechanism 70 and the paper thickness sensor 40, respectively, of the sensor unit 18 but are different in that a contact portion 402 is used as described below without using a roller (conveyance roller pair 41).

A pressing region a70 corresponds to a pressing surface of the pressing plate 701 of the sheet pressing mechanism 700. The pressing plate 701 is provided with an opening corresponding to the detection region a40, and the contact portion 402 of the paper thickness sensor 400 is disposed inside the opening. The contact portion 402 swings within a predetermined range and is biased upward (toward a bottom surface S1). In a state where the pressing plate 701 is lifted toward the bottom surface S1 of the upper casing 81, heights of the contact portion 402 when the sheet 300 is present and when it is not are detected by respective height position sensors, and the thickness of the sheet 300 is detected by a difference (μm) therebetween.

The controller of the sensor unit 80 starts measurement of the sheet property by the basis weight sensor 500 when the first medium set sensor 850 on the front side is turned ON (with paper), and subsequently, when the second medium set sensor 860 on the back side is turned ON, the controller determines that the sheet 300 has been set, and measures the sheet properties by the paper thickness sensor 400 and the surface property sensor 600 while pressing the sheet 300 by the pressing plate 701 lifted by the sheet pressing mechanism 70. Thereafter, after the measurement is completed, the pressing plate 701 is lowered to free the sheet 300, and the measurement of various sheet properties is completed.

In this manner, the sensor unit 80 generates the second property data of the sheet 300 related to the sheet thickness, basis weight, and surface property by inserting the sheet 300 into the sheet passage region 800. The controller 11 of the image formation apparatus 10 acquires the second property data via the communication unit 16, and performs sheet registration of the sheet 300 and setting of image forming conditions on the basis of the second property data.

The sensor units 18 and 80 may include sensors other than those described above, and the first and second property data may include property data other than those described above. For example, the first and second property data may include property data related to other surface properties and property data related to water content. The other surface property is, for example, an index related to the depth amount of the sheet 300 according to the uneven state of the surface. Specifically, the property data related to the other surface property is detected by irradiating the surface of the sheet 300 with light at a large incident angle (80 degrees or more and less than 90 degrees), photographing this state, and performing image processing on the obtained image data. The property data related to the water content is detected by, for example, a water content sensor that optically detects the light absorption amount of the OH group of the near infrared method. This water content meter uses a property such that, when the sheet 300 is irradiated with light of a predetermined wavelength in the near-infrared region, a light absorption rate changes according to the water content of the sheet 300. Further, the first and second property data may include property data related to rigidity. The property data related to rigidity is detected, for example, by measuring an index of a force with which the sheet 300 presses an outer guide plate among the guide plates constituting the curved conveyance path 143.

(Functional Configuration of Controller)

Figure 6:
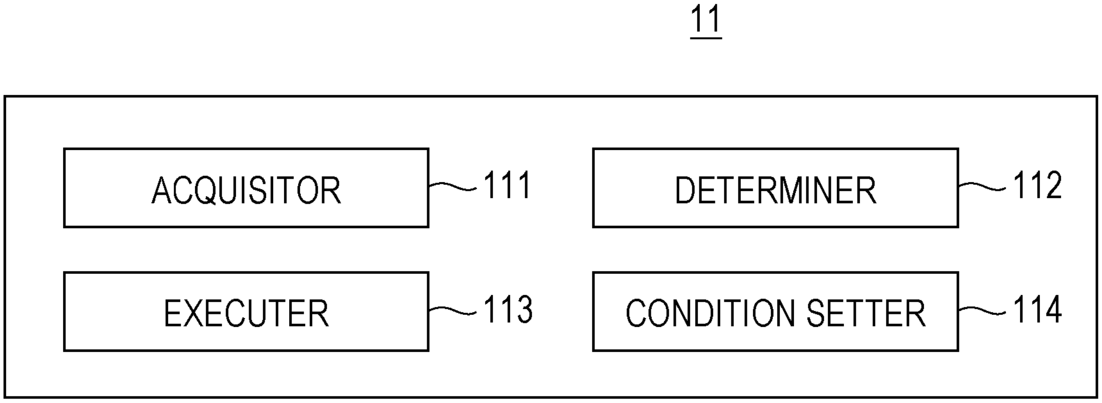
FIG. 6 is a block diagram illustrating a functional configuration of a controller illustrated in FIG. 1.

FIG. 6 is a block diagram illustrating an example of a functional configuration of the controller 11. In the image formation apparatus 10, for example, the controller 11 reads a program stored in the storage unit 12 and executes processing, thereby functioning as an acquisitor 111, a determiner 112, an executer 113, and a condition setter 114.

The acquisitor 111 acquires the first property data of the sheet 300 generated by the sensor unit 18 and the second property data of the sheet 300 generated by the sensor unit 80. The acquisitor 111 may acquire the first property data and the second property data of the sheet 300 used for the same print job, or may acquire the first property data and the second property data of the sheet 300 used for different print jobs from each other.

The determiner 112 determines the category to which the sheet 300 belongs by comparing each of the first property data and the second property data acquired by the acquisitor 111 with data stored in advance in the storage unit 12 or the like. Specifically, the determiner 112 determines the paper type, basis weight category, and paper profile of the sheet 300. Thus, sheet registration for the sheet 300 is performed on the basis of each of the first property data and the second property data.

The executer 113 collates the first property data of the sheet 300 acquired by the acquisitor 111 with the information related to the paper type, basis weight category, and paper profile of the sheet 300 determined by the determiner 112 on the basis of the second property data, thereby controlling execution of a print job, specifically, conveyance operation of the sheet 300 and image forming operation on the sheet 300. The executer 113 may control the execution of the print job by collating the first property data and the second property data of the sheet 300 acquired by the acquisitor 111.

The condition setter 114 sets various conditions for image formation on the basis of the paper type, basis weight category, and paper profile of the sheet 300 determined by the determiner 112. For example, a table in which the paper type, the basis weight category, and the paper profile are associated with various conditions of the image former 13 is stored in advance in the storage unit 12 or the like, and the condition setter 114 determines various conditions on the basis of the paper type and the paper profile of the sheet 300 determined by the determiner 112. For example, the condition setter 114 determines various conditions such as a sheet feeding condition of the sheet feeding conveyance unit 14, a transfer current value of the secondary transfer unit 135, and a fixing temperature of the fixing unit 136. When the acquisitor 111 acquires both the first property data and the second property data of the sheet 300 used for the same print job, the condition setter 114 may determine various conditions on the basis of the paper type, basis weight category, and paper profile determined on the basis of the first property data, or may determine various conditions of the image former 13 on the basis of the paper type, basis weight category, and paper profile determined on the basis of the second property data.

(Print Processing)

Figure 7:
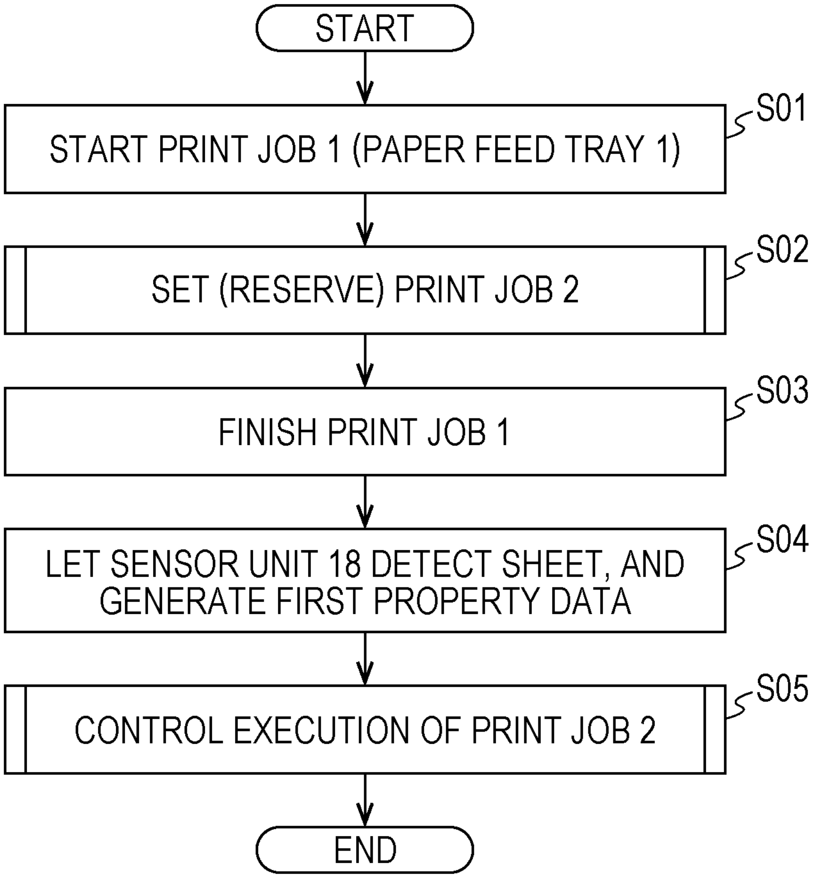
FIG. 7 is a flowchart illustrating an example of printing processing by the image formation system illustrated in FIG. 1.

FIG. 7 is a flowchart illustrating an example of printing processing using the image formation system 1. This printing process is executed by the image formation system 1 used in, for example, a print shop or the like.

(Step S01)

First, the image formation system 1 starts a predetermined print job (hereinafter referred to as a print job 1). Specifically, a user (for example, an employee, an operator, or the like of a print shop or the like) loads (sets) the sheet 300 in a predetermined sheet feed tray (hereinafter, it is referred to as a sheet feed tray 1), and then causes the image formation apparatus 10 to execute the print job 1.

During a period from the start of the print job 1 by the image formation apparatus 10 to the end of the print job 1 (step S03), the sensor unit 18 provided in the image formation apparatus 10 cannot detect the sheet 300 to be used for another print job (for example, a print job 2 to be described later). This is because the conveyance path 143 is used for the image forming operation during this period.

(Step S02)

Figure 8:
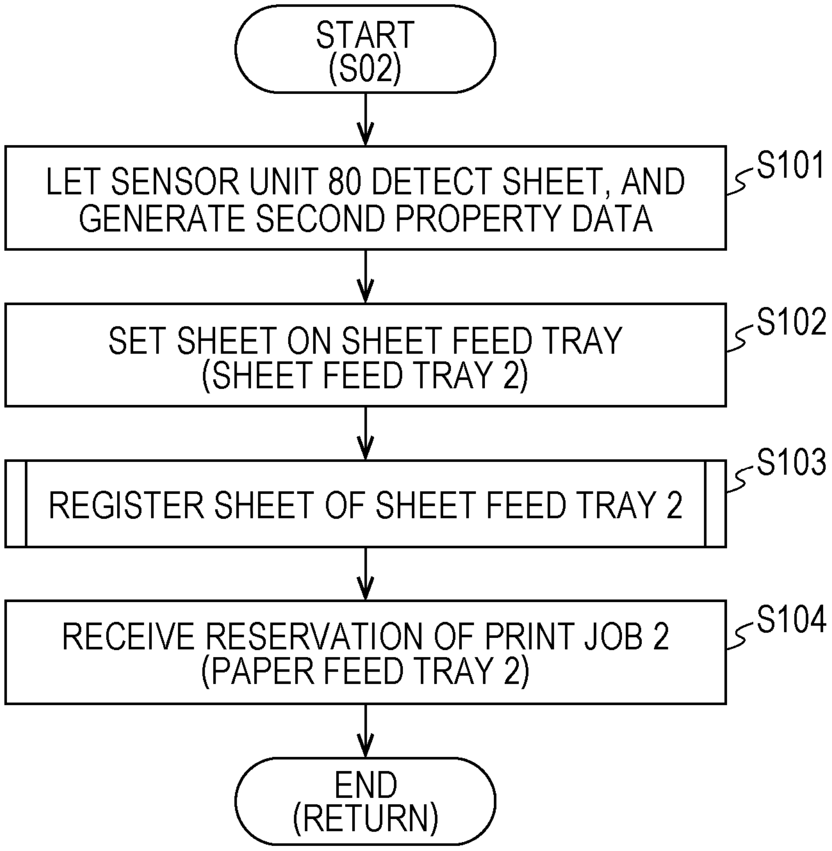
FIG. 8 is a flowchart illustrating a subroutine of step S02 illustrated in FIG. 7.

After the image formation system 1 starts the print job 1, the user performs reservation setting of a print job subsequent to the print job 1 (hereinafter, the print job is referred to as a print job 2). FIG. 8 is a subroutine flowchart illustrating processing in this step S02.

(Step S101)

In step S02, first, the sensor unit 80 detects the sheet 300 to be used in the print job 2, and generates the second property data. Specifically, the user inserts the sheet 300 into the sensor unit 80, and lets the sensor unit 80 detect the sheet 300. The controller 11 of the image formation apparatus 10 acquires the second property data generated in this step S101, and performs sheet registration of the sheet 300 (step S103 to be described later). The sheet 300 detected by the sensor unit 80 is set on the sheet feed tray in the next step S102, for example.

(Step S102)

Next, the user sets the sheet 300 for which the second property data is generated in step S101 in a sheet feed tray (hereinafter referred to as a sheet feed tray 2) other than the sheet feed tray 1.

(Step S103)

Subsequently, in the image formation system 1, the sheet registration of the sheet 300 set in the sheet feed tray 2 is performed on the basis of the second property data generated in step S101. Specifically, when the user operates an operation screen or the like displayed on the operation panel 15, the controller 11 starts processing of sheet registration. The processing of sheet registration by the controller 11 will be described later.

(Step S104)

Thereafter, the image formation apparatus 10 receives reservation of the print job 2 using the sheet feed tray 2. Specifically, the user operates an operation screen or the like displayed on the operation panel 15, so that a reservation of the print job 2 is received. This reservation includes print data and print setting data called a job ticket. Thus, processing of the reservation setting of FIG. 8 ends (end and return), and returns to the processing of FIG. 7.

(Step S03)

After finishing the print job 1, the image formation system 1 advances the processing to step S04.

(Step S04)

After finishing the print job 1, the image formation system 1 conveys the sheet 300 from the sheet feed tray 2 to the conveyance path 143, and lets the sensor unit 18 detect the sheet. Thus, the first property data of the sheet 300 is generated and acquired by the controller 11. The first property data of the sheet 300 is displayed on the operation panel 15, for example.

Figure 9:
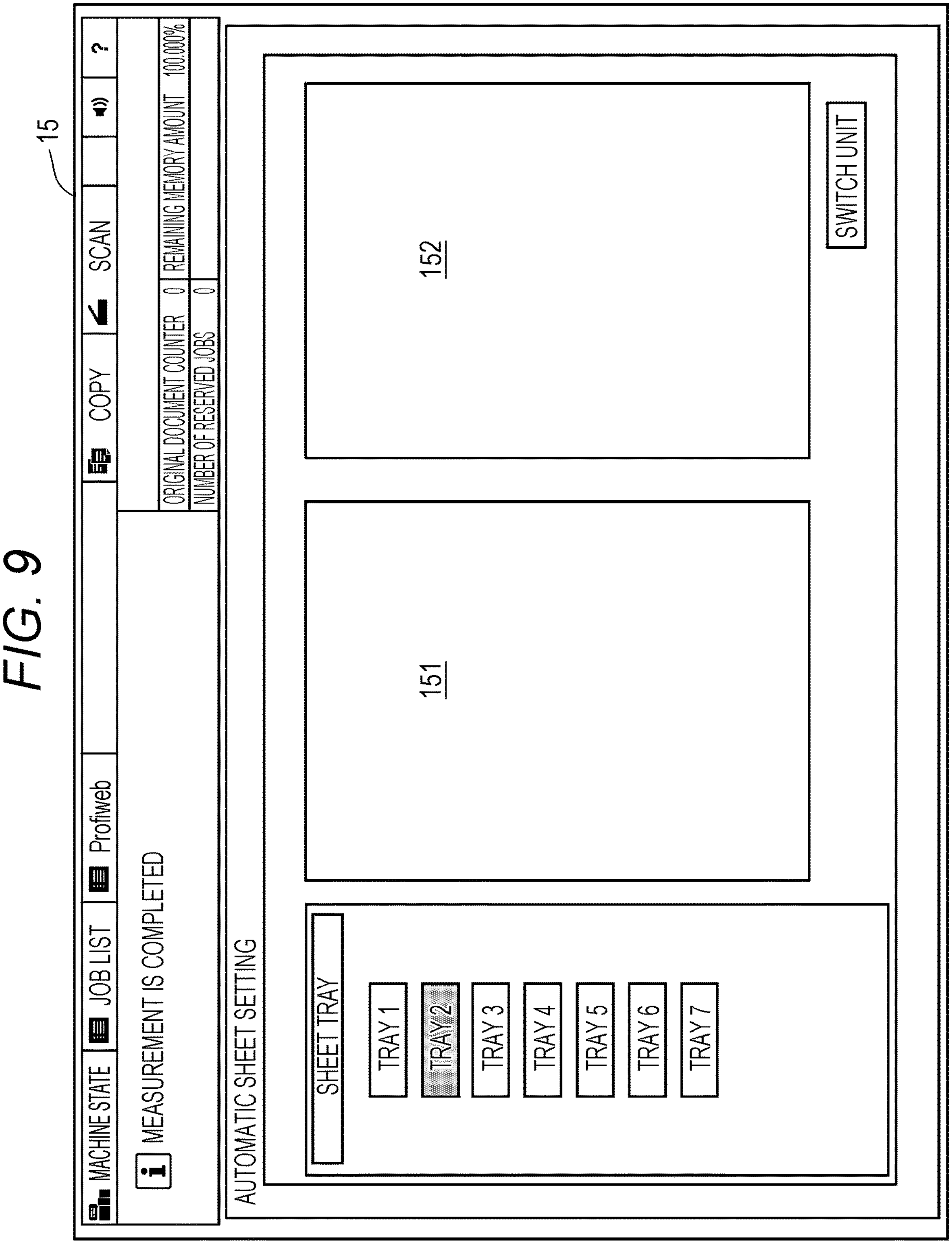
FIG. 9 is a diagram illustrating an example of a display image of a display illustrated in FIG. 1.

FIG. 9 illustrates an example of a screen of the operation panel 15 after the processing in step S04. On the screen of the operation panel 15, for example, a display area 151 and a display area 152 are provided at adjacent positions. For example, the first property data of the sheet 300 generated in step S04 is displayed in the display area 151, and the second property data of the sheet 300 generated in step S101 is displayed in the display area 151.

(Step SO5)

After the sensor unit 18 generates the first property data of the sheet 300, the image formation system 1 controls the execution of the print job 2 for which the reservation setting is performed in step S02. Specifically, the controller 11 determines execution or suspension of the print job 2 by collating information regarding the sheet 300 of the sheet feed tray 2 for which the sheet registration is performed in step S103 with the first property data generated in step S04. Thus, it is possible to suppress occurrence of a mistake when the user sets the sheet 300 in the sheet feed tray 2. For example, in a case where the user erroneously sets the front and back sides of the sheet 300 and the orientation of the sheet 300 in the sheet feed tray 2, the print job 2 is suspended, and a warning is notified to the user.

Figure 10:
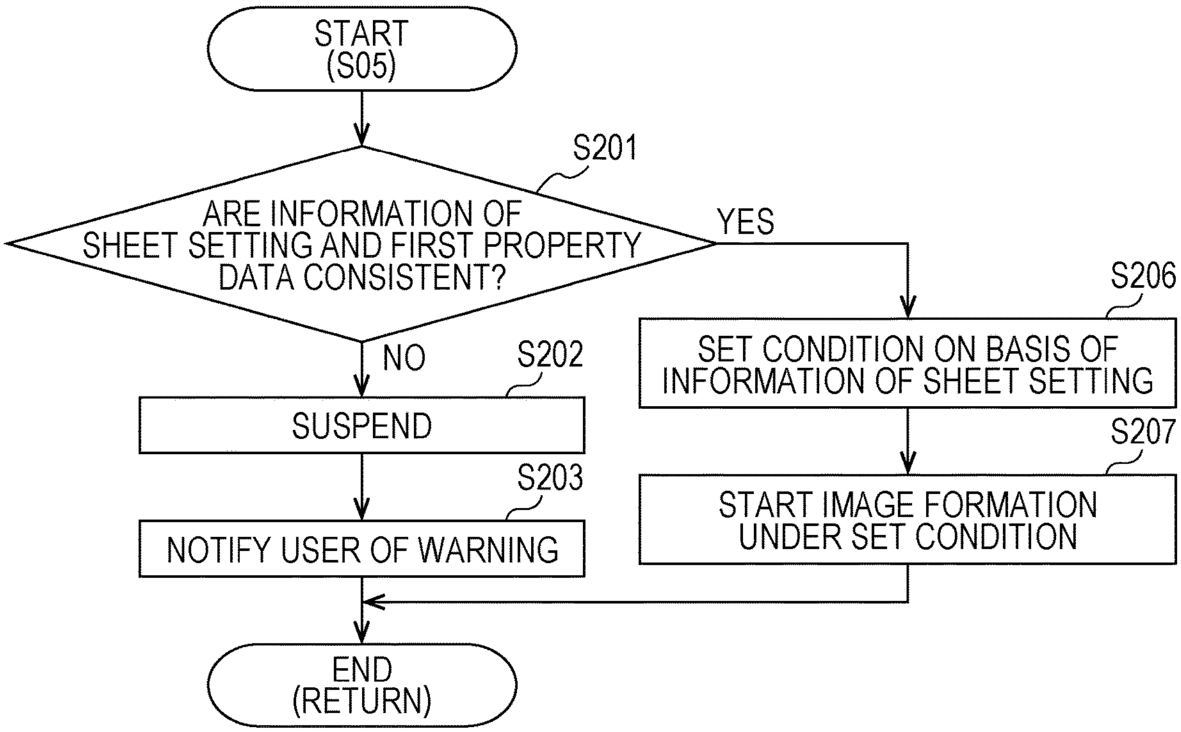
FIG. 10 is a flowchart illustrating a subroutine of step S05 illustrated in FIG. 7.

FIG. 10 is a subroutine flowchart illustrating the processing in this step S05.

(Step S201)

First, the controller 11 collates the information regarding the sheet 300 of the sheet feed tray 2 for which the sheet registration is performed in step S103 with the first property data generated in step S04, and determines whether or not these are consistent with each other. In other words, it is determined whether the information of the sheet 300 based on the second property data and the first property data are consistent with each other. When it is determined that they are not consistent (NO), the controller 11 advances the processing to step S202. When it is determined that they are consistent (YES), the controller 11 advances the processing to step S206.

In step S201, the determination criterion as to whether or not to be consistent may be changed according to an external environment such as humidity. A time difference between the time when the sensor unit 80 generates the second property data and the time when the sensor unit 18 generates the first property data causes a deviation due to moisture absorption of the sheet 300 or the like to occur between the first property data and the second property data. The magnitude of the deviation between the first property data and the second property data changes depending on, for example, a value of basis weight or the like.

Figure 11:
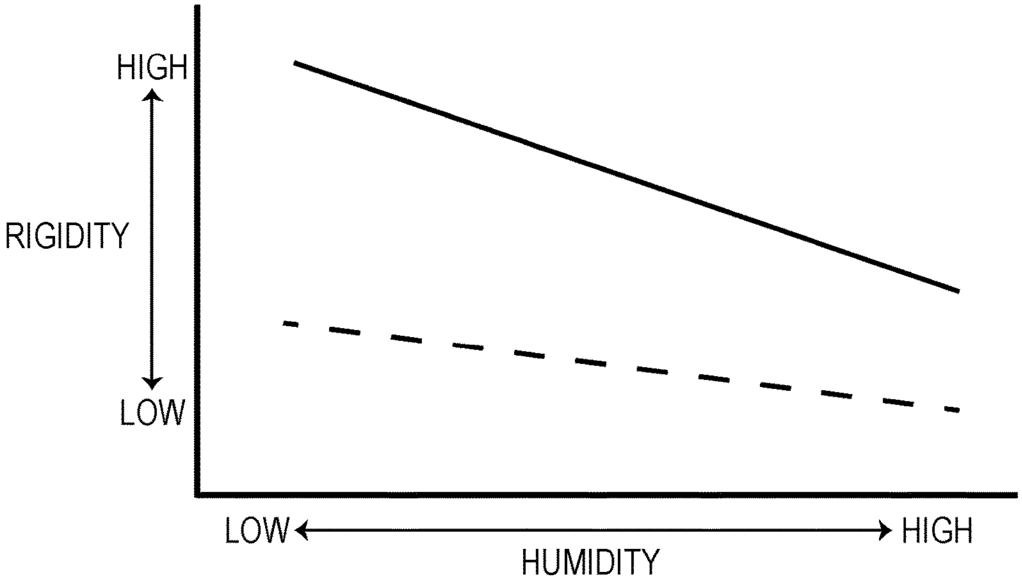
FIG. 11 is a diagram illustrating a relationship between humidity and rigidity of a sheet.

FIG. 11 illustrates an example of a change in rigidity of the sheet 300 due to a change in humidity. A solid line represents a change in rigidity of the sheet 300 having a relatively large basis weight, and a broken line represents a change in rigidity of the sheet 300 having a relatively small basis weight. In the sheet 300 having a relatively large basis weight, a change in rigidity due to a change in humidity becomes relatively large. It is preferable that the controller 11 changes the determination criterion of step S201 in consideration of such a difference in change in rigidity due to the value of basis weight. For example, the controller 11 changes the determination criterion in step S201 according to the information acquired from the temperature and humidity sensor 19, the operation status (for example, turning on and off the power supply) of the dehumidifying heater disposed in the sheet feed tray 1 (or the sheet feed tray 2), and the like. The time (measurement time) at which the first property data and the second property data are generated and the information of the temperature and humidity sensor 19 at this time are stored in the storage unit 12 or the like in association with the first and second property data.

(Step S202)

When NO is determined in the processing of step S201, the controller 11 stops the execution of the prepared print job 2.

(Step S203)

Next, the controller 11 notifies the user of a warning by a method such as displaying a warning message on the operation panel 15 or the like, and ends the processing (returns to the processing of FIG. 7).

(Step S206)

When YES is determined in the processing of step S201, the controller 11 sets various conditions of the print job 2 on the basis of the sheet registration information of the sheet 300 performed in step S103. For example, the controller 11 sets a sheet feeding condition of the sheet feeding conveyance unit 14, a transfer current value of the secondary transfer unit 135, a fixing temperature of the fixing unit 136, and the like. The controller 11 may perform sheet registration on the basis of the first property data acquired in step S04 and set various conditions of the print job 2.

(Step S207)

Thereafter, the controller 11 executes the print job 2 under the condition determined in step S206 and ends the process (returns to the processing of FIG. 7).

Here, an example of processing of sheet registration in step S103 will be described with reference to FIG. 12.

(Step S1031)

First, the controller 11 acquires second property data of the sheet 300 detected by the sensor unit 80.

(Step S1032)

Next, the controller 11 estimates the paper type to which the sheet 300 belongs and the basis weight category by using the second property data acquired in step S1031, the learned model (paper type discrimination engine) stored in the storage unit 12 or the like, and basis weight category probability calculation processing. For example, the controller 11 estimates a combination (hereinafter described as a paper type/basis weight category) of any paper type of gloss paper, matte paper, high-quality paper, and plain paper and a basis weight category.

The learned model used for estimating the paper type is generated by supervised learning using teacher data, for example, with data of each medium obtained by medium detection by the sensor units 18 and 80 as an input value and paper type information set by the user as a correct answer label. External data may be used as the teacher data. A learning machine (not illustrated) can generate a learned model by a learning method using a neural network configured by combining perceptrons. Note that the learning method is not limited to this, and various methods can be employed as long as it is supervised learning. For example, random forest, support vector machine (SVM), boosting, Bayesian network linear discriminant method, nonlinear discriminant method, and the like can be applied. Further, a stand-alone high-performance computer using a CPU and a processor of a graphics processing unit (GPU) or a cloud computer can be used as the learning machine.

In step S1032, the controller 11 may estimate a paper profile candidate approximate to the sheet 300 together with the paper type/basis weight category or instead of the paper type/basis weight category. Note that the paper profile is obtained by associating data and the like of each medium obtained by the medium detection by the sensor units 18 and 80 with property data input from the user, a sheet size, an arbitrary identification name (for example, a paper name), and the like, and registering them in advance. The property data input from the user includes, for example, various control parameters such as conveyance system property data (a front and back adjustment value, a deviation correction value, and the like), image formation property data (fixing temperature value, density adjustment value, y correction value, and the like), and a sheet feed system property value (a separation fan air volume adjustment value of the sheet feed tray).

(Step S1033)

After estimating the paper type/basis weight category and the paper profile candidate of the sheet 300 on the basis of the second property data, the controller 11 displays these estimation results on the operation panel 15. For example, the controller 11 displays a plurality of paper type/basis weight categories and a plurality of paper profile candidates on the operation panel 15 in descending order of the probability of conforming to the sheet 300.

(Step S1034)

Subsequently, the controller 11 determines whether or not the paper type/basis weight category and the paper profile candidates displayed in step S1033 have been changed. For example, the user changes the paper type/basis weight category and the paper profile candidates on the operation screen displayed on the operation panel 15. When the user has changed the paper type/basis weight category and the paper profile candidates (YES), the controller 11 advances the processing to step S1035. When the user does not change the paper type/basis weight category and the paper profile candidates (NO), the controller 11 advances the processing to step S1036.

(Step S1035)

When the paper type/basis weight category and the paper profile candidates have been changed, the controller 11 performs sheet registration of the sheet 300 on the basis of content after the change.

(Step S1036)

When the paper type/basis weight category and the paper profile candidates have not been changed, the controller 11 performs sheet registration of the sheet 300 on the basis of the paper type/basis weight category and the paper profile candidate displayed in step S1033.

In steps S1031 to S1036 described above, the case where the controller 11 performs sheet registration of the sheet 300 on the basis of the second property data has been described, but the controller 11 may perform sheet registration of the sheet 300 on the basis of the first property data.

(Operation and Effect of Image Formation Apparatus and Image Formation System)

In the image formation apparatus 10 and the image formation system 1 according to the present embodiment, in addition to the first property data generated by the in-line type sensor unit 18, the second property data generated by the off-line type sensor unit 80 is automatically acquired. Thus, even in a period in which the sensor unit 18 cannot generate the first property data (for example, during execution of the print job 1 described above), the sheet registration of the sheet 300 can be performed on the basis of the second property data. Therefore, the efficiency of the medium detection can be enhanced, and a plurality of print jobs can be efficiently executed. Hereinafter, this operation and effect will be described.

While the image formation apparatus executes a print job, a sheet for image formation is conveyed to the conveyance path. Therefore, in a case where the medium detection is performed only by the in-line type sensor unit, the medium detection and the sheet registration of the sheet to be used for the next print job (print job 2) are performed after waiting for the end of the print job 1. Therefore, when the medium detection is performed only by the in-line type sensor unit, it may be difficult to efficiently perform a plurality of print jobs continuously due to the time required for the medium detection and the sheet registration.

On the other hand, in the image formation apparatus 10 and the image formation system 1, in addition to a result of the medium detection (first property data) by the in-line type sensor unit 18, a result of the medium detection (second property data) by the off-line type sensor unit 80 is automatically acquired. Thus, even while the image formation apparatus 10 is executing the print job 1, the sheet registration of the sheet 300 used for the print job 2 can be performed on the basis of the second property data generated by the sensor unit 80. Therefore, as compared with a case where the medium detection is performed only by the in-line type sensor unit, the time required for the medium detection and the sheet registration is shortened, and a plurality of print jobs can be efficiently performed continuously.

Further, in such an image formation apparatus 10 and the image formation system 1, since it is not necessary to perform sheet passing and sheet registration in advance in the in-line type sensor unit, it is possible to reduce the time required for sheet passing and sheet registration in advance and to perform a print job more efficiently. Furthermore, the sheet 300 detected as a medium by the off-line type sensor unit 80 can be reused.

As described above, with the image formation apparatus 10 and the image formation system 1 of the present embodiment, the second property data is acquired in addition to the first property data generated by the sensor unit 18. Thus, even in a period in which the sensor unit 18 cannot generate the first property data, the second property data can be acquired. Therefore, the efficiency of the medium detection can be enhanced.

Further, in the image formation apparatus 10 and the image formation system 1, the information of the sheet 300 for which the sheet registration is performed on the basis of the second property data is collated with the first property data of the sheet 300 detected by the sensor unit 18 immediately before the print job is executed. Thus, it is possible to suppress occurrence of a mistake when the user sets the sheet 300 in the sheet feed tray 2.

The configurations of the sensor unit, the image formation apparatus, and the image formation system described above have been described with respect to main components in describing the features of the above embodiment, and are not limited to the above configurations, and various modifications can be made within the scope of claims. Further, configurations included in a general sensor unit, an image formation apparatus, and an image formation system are not excluded.

Further, in the above embodiment, an example has been described in which the first detector (sensor unit 18) is provided inside the image formation apparatus 10 and the second detector (sensor unit 80) is disposed outside the image formation apparatus 10, but the disposition of the first detector and the second detector is not limited thereto. For example, the first detector and the second detector may be provided inside different image formation apparatuses from each other.

Further, in the above description, the image formation apparatus has been described as a specific example of the conveyance device of the present invention, but the conveyance device of the present invention is not limited to the image formation apparatus as long as it has a conveyance path. For example, the conveyance device of the present invention may be a post-processing device used after image formation.

Further, units and methods for performing various types of processing in the conveyance device, the image formation apparatus, and the image formation system according to the above-described embodiment can be achieved by either a dedicated hardware circuit or a programmed computer. The program may be provided by, for example, a computer-readable recording medium such as a USB memory or a digital versatile disc (DVD)-ROM, or may be provided online via a network such as the Internet. In this case, the program recorded in the computer-readable recording medium is usually transferred to and stored in a storage unit such as a hard disk. Further, the program may be provided as independent application software, or may be incorporated into software of an apparatus as one function of the apparatus.

Although embodiments of the present invention have been described and illustrated in detail, the disclosed embodiments are made for purposes of illustration and example only and not limitation. The scope of the present invention should be interpreted by terms of the appended claims

What is claimed is:

1. A conveyance device comprising:

a conveyance path on which a medium is carried;

a first detector that detects the medium on the conveyance path and generates first property data; and a hardware processor that acquires the first property data from the first detector and second property data from a second detector that is disposed outside the conveyance device, the second detector being configured to detect the medium and generate the second property data.

2. The conveyance device according to claim 1, wherein a second detector that generates the second property data is disposed outside the conveyance device.

3. The conveyance device according to claim 1, wherein the first property data and the second property data include data related to a same property of the medium.

4. The conveyance device according to claim 3, wherein the first property data and the second property data include data related to a same property of at least one of surface property, basis weight, or thickness of the medium.

5. The conveyance device according to claim 1, further comprising a display capable of displaying information regarding the first property data and the second property data acquired by the hardware processor.

6. The conveyance device according to claim 1, wherein the hardware processor determines a category to which the medium belongs on a basis of comparison between the first property data acquired by the hardware processor and data stored in advance.

7. The conveyance device according to claim 6, wherein the hardware processor further determines the category to which the medium belongs by comparing the second property data acquired by the hardware processor with the data stored in advance.

8. The conveyance device according to claim 7, wherein the hardware processor controls a conveyance operation of the medium by determining whether or not the first property data acquired by the hardware processor and information of the category to which the medium determined on a basis of the second property data belongs are consistent.

9. The conveyance device according to claim 8, wherein a criterion of determining whether or not to be consistent is made is changeable.

10. The conveyance device according to claim 1, wherein the hardware processor acquires the second property data via a network and/or wiring.

11. The conveyance device according to claim 1, wherein the second detector detects the second property data of the medium manually inserted by user.

12. An image formation apparatus comprising:

a conveyance path on which a medium is carried;

a first detector that detects the medium on the conveyance path and generates first property data;

a hardware processor that acquires the first property data from the first detector and second property data from a second detector that is disposed outside the image formation apparatus, the second detector being configured to detect the medium and generate the second property data; and an image former that forms an image on the medium conveyed on the conveyance path.

13. The image formation apparatus according to claim 12, wherein the hardware processor determines a category to which the medium belongs on a basis of comparison between the first property data acquired by the hardware processor and data stored in advance.

14. The image formation apparatus according to claim 13, wherein the hardware processor further determines the category to which the medium belongs by comparing the second property data acquired by the hardware processor with the data stored in advance.

15. The image formation apparatus according to claim 13, wherein the hardware processor sets a condition of the image former on a basis of the category to which the medium determined by the hardware processor belongs.

16. An image formation system comprising:

the image formation apparatus according to claim 12; and a second detector that is disposed outside the image formation apparatus and generates the second property data.

* * * * *